(12) United States Patent
Hinrichs

(10) Patent No.: US 7,536,946 B2
(45) Date of Patent: May 26, 2009

(54) DEVICE AND METHOD FOR ENGAGING PENETRABLE ITEMS

(75) Inventor: John Hinrichs, Wodonga (AU)

(73) Assignee: Mars Incorporated, McLean, VA (US)

(*) Notice: Subject to any disclaimer, the term of this patent is extended or adjusted under 35 U.S.C. 154(b) by 1170 days.

(21) Appl. No.: 10/833,783

(22) Filed: Apr. 28, 2004

(65) Prior Publication Data

US 2005/0000371 A1   Jan. 6, 2005

(30) Foreign Application Priority Data

Apr. 28, 2003   (AU) ............................. 2003902038

(51) Int. Cl.
*A22C 7/00* (2006.01)
*B65H 3/22* (2006.01)
*A01K 81/04* (2006.01)

(52) U.S. Cl. ..................... 99/427; 271/18.3; 294/61

(58) Field of Classification Search .............. 99/427, 99/426, 428, 429, 430, 431, 432, 433, 434, 99/435, 436, 437, 438, 439, 440, 441, 442; 271/18.3; 294/61
See application file for complete search history.

(56) References Cited

U.S. PATENT DOCUMENTS

| | | | |
|---|---|---|---|
| 4,015,872 A | | 4/1977 | Loznak et al. |
| 4,130,314 A | | 12/1978 | Storm |
| 4,214,741 A | | 7/1980 | Crawford |
| 4,753,336 A | * | 6/1988 | Taylor et al. ............... 198/560 |
| 4,905,616 A | | 3/1990 | Bisson et al. |
| 5,205,208 A | * | 4/1993 | Gongwer .................... 99/345 |
| 5,431,093 A | * | 7/1995 | Dodgen ...................... 99/427 |
| 5,761,991 A | * | 6/1998 | Kambies ..................... 99/427 |
| 6,309,001 B1 | | 10/2001 | Sherwin et al. |
| 6,782,806 B2 | * | 8/2004 | Backus et al. ............... 99/427 |

FOREIGN PATENT DOCUMENTS

| | | |
|---|---|---|
| DE | 36 42 123 | 6/1988 |
| FR | 2639334 | 5/1990 |
| JP | 62-153035 | 7/1987 |
| JP | 06147156 | 12/1995 |
| NL | 1018982 | 6/2003 |

* cited by examiner

*Primary Examiner*—Daniel L Robinson
(74) *Attorney, Agent, or Firm*—Fulbright & Jaworski, LLP

(57) ABSTRACT

There is disclosed a tool for engaging, capturing and depositing food items, said tool including: a bracket arranged to couple the tool to a device for imparting controlled movement to the tool, preferably a programmable robot arm; a plurality of penetration pins arranged to facilitate the capture of food items by impalement; a penetration pin support member attached to said bracket and to which are anchored said pins, said pins being arranged such as to extend away from said support member; an ejection member for interacting with said support member, having apertures through which said pins project, means for imparting relative movement between the support member and the ejection member; wherein penetration and capture of said food items is effected by movement of the tool via said device; and wherein deposition of said food items is effected by said relative movement of the support member and the ejection member thereby to push said food items off the end of said pins. Also disclosed is a method of utilizing said tool to create a shingled array of penetrable items.

12 Claims, 3 Drawing Sheets

DEVICE AND METHOD FOR ENGAGING PENETRABLE ITEMS

CROSS-REFERENCE TO RELATED APPLICATIONS

This application claims priority to AU 2003902038 filed Apr. 28, 2003.

TECHNICAL FIELD

The invention relates to a tool for the picking up and placing of relatively soft, penetrable materials, such as foodstuffs, whether individually or in groups. In particular, the invention relates to a tool for engaging and moving precisely arranged food materials without destroying their arrangement.

BACKGROUND OF THE INVENTION

The manufacture of premium food items increasingly requires greater sophistication in visual presentation of the food items themselves. This may mean that the food items must be consistently presented in a particular arrangement in the food packaging. The precise arrangement of small and delicate materials in food containers has traditionally relied upon intensive manual labor. However, the labor expense and low production rates that attend such manual processes make them prohibitive for all but the most expensive products.

The increasing speed and sophistication of automated robots, and their consequent use in delicate and precise high-speed operations, has opened up opportunities to develop lower cost processes for the precise placement of food items, given that these robots offer rapid and accurate positioning of the food items.

However, there remains a major challenge to devise suitable apparatus for directly engaging these food items, especially where these items have relatively uneven surfaces, such as solid or semi-solid food items, and where it is desired to grasp and relocate a group of such items in order that their original configuration or arrangement is substantially maintained. In particular, where it is desired to transport a group of such items and deposit them in, for example, a precise arrangement, for example a 'shingle' arrangement consisting of an overlapping row of relatively flat items, the design of the appropriate engagement apparatus is necessarily a difficult task.

In the field of materials handling, there have been devised myriad different means for engaging and in some way grasping individual items for lifting and moving such items to a different, new location. However, the characteristics of each type of item influence the suitability of each individual engaging means for use with that item.

A traditional engaging means for mechanical lifting devices are suction cups. These work well for engaging materials that have very even and consistent surfaces. However, solid and semi-solid food materials, due to their nature, do not typically have such surfaces. Therefore, suction cups do not tend to be suitable for these applications.

Another well-known means for grasping items is the use of a mechanical grasping device that relies on compression of the item between opposed surfaces. However, the use of compression forces on solid and semi-solid food materials tends to result in damage to the items, and to inconsistent pick-up rates. Therefore, such devices do not meet the need to place single food items, and especially do not lend themselves to relocating groups of food items where the relative position of such items within an array or arrangement must be maintained.

Disclosed in U.S. Pat. Document No. 4,015,872 by Loznak et al ('Loznak') is an apparatus for lifting and depositing penetrable materials that relies upon the impalement of the materials by a plurality of 'spears', the twisting of the spears to engage the underneath surface of the material in order to allow lifting, and depositing by 'un-twisting' the spears to allow the heads of the spears to be withdrawn through the slits created by the initial penetration of the spear. This kind of apparatus does not rely on the surface characteristics of the material, and appears suitable for resilient penetrable materials such as fabric, resin or laminated stock. However, the aspect of slicing or tearing a slit or hole in the material would tend to make this apparatus unsuitable for more delicate food materials such as meat or reconstituted meat pieces. There is also no indication of how a group of materials might be transported in any configuration other than perhaps an aligned stack of objects.

Disclosed in U.S. Pat. Document No. 6,309,001 B1 by John P. Sherwin ('Sherwin') is an apparatus that uses a plurality of relatively thin 'forks' to grasp and penetrate food materials such as baked goods. This provides a means for grasping materials that tends to result in a lower level of damage to those materials. However, as the disclosed forks are capable of penetrating only individual items, this kind of apparatus is not suitable for relocating groups of items while maintaining their relative position within a group arrangement, and especially not where the arranged group of items that must be deposited is to take the form of a 'shingle'.

Therefore, it is an object of the present invention to provide an apparatus that enables consistent grasping of food items for their relocation. It is a further object of the invention to provide grasping apparatus that is suitable for picking up individual food items to compile a group thereof and then relocate this group of food items, whilst maintaining their specific arrangement within the group. It is a further object of the invention to provide such apparatus that is suitable for use where it is desired to relocate a group of food items arranged in a shingle configuration. It is a further object of the invention to provide a method of operating said apparatus to compile and relocate such a shingle.

BRIEF SUMMARY OF THE INVENTION

According to one aspect of the invention, there is provided a tool for engaging, capturing and depositing food items, said tool including:

a bracket arranged to couple the tool to a device for imparting controlled movement to the tool, preferably a programmable robot arm;

a plurality of penetration pins arranged to facilitate the capture of food items by impalement;

a penetration pin support member attached to said bracket and to which are anchored said pins, said pins being arranged such as to extend away from said support member;

an ejection member for interacting with said support member, having apertures through which said pins project, means for imparting relative movement between the support member and the ejection member;

wherein penetration and capture of said food items is effected by movement of the tool via said device; and wherein deposition of said food items is effected by said relative movement of the support member and the ejection member thereby to push said food items off the end of said pins.

Preferably, said food items are impaled such that they are captured via frictional forces in a position between the penetrating tip of said pins and said ejection member.

Preferably, deposition of said items is effected by actuation of movement of said ejection plate in a relative direction away from said support member, thereby to push said food items off the end of said pins.

Preferably, the pins are between 0.5 mm and 2.5 mm in diameter in order to effect a level of engagement with the items that allows reliable capture, but without damaging the items' integrity. Advantageously, where said items are sliced meat pieces, the pin diameter is about 1 mm.

Advantageously, the pins are disposed in a plurality of rows of substantially parallel pins, in which individual pins are evenly spaced. An especially advantageous configuration for the capture of sliced meat pieces is two or more rows of nine pins, wherein the pins within the rows are spaced by between about 5 mm and 15 mm, preferably about 10 mm, and wherein the rows are spaced apart by between about 15 mm and 35 mm, preferably about 25 mm.

Preferably, the ejection member is a plate that is arranged substantially parallel with the adjacent surface of the support member, and wherein said ejection plate moves relatively away from said support member while maintaining a substantially parallel alignment with said member. This kind of ejection movement encourages the maintenance of a 'shingle' arrangement of a group of food pieces during deposition, where such is desired.

Advantageously, the penetration pins extend through individual holes in said ejection plate. Alternatively, the ejection plate may feature slots extending from one side of said plate, such that the plate resembles a 'comb', and such that said pins extend through said slots.

Preferably, one or more actuation devices, such as pneumatic cylinders, hydraulic cylinders or electrical servo-motors, are mounted on said support member and feature extension arms that are connected to said ejection member, wherein extension of said arms actuates said relative motion of said ejection member with respect to said support member.

A method of compiling and depositing a shingled array of a predetermined number of penetrable food items, using an engaging tool as defined above, said method including the steps of:

a) presenting a plurality of food items on a substantially flat surface;

b) positioning said tool above a first item such that two or more pins which are offset from the center of said array of pins are directly above said item;

c) lowering said tool such that said offset pins are caused to penetrate substantially through said item thereby to capture it via impalement;

d) raising said tool and said captured item and repositioning it above a second item, such that said first item is positioned above said second item in an offset manner, said offset distance being less than the dimension of the first item in the direction of offset;

e) repeating steps c) and d) above until the predetermined number of items has been captured;

f) positioning said tool above the destination of the array of items; and g) depositing said array by actuating said ejection plate in a downward motion to eject said array of said items from said pins as a group resembling a shingle.

In the deposition stage of the above method, the action of the ejection plate on the uppermost item tends to cause it to press on the second uppermost item, and in turn the action of the uppermost item on the second uppermost item tends to cause it to press on the third uppermost item and wherein this action is replicated with respect to successive items such that the group is deposited in said container in a shingle arrangement.

In another aspect of the invention, there is provided apparatus for pick-up and deposition of one or more food items, including:

a device for imparting controlled movement to the tool, preferably a programmable robot arm; and an engagement tool, according to any described above, that is attached to said robotic device;

wherein said apparatus is adapted to perform the method described above.

Now will be described, by way of a specific non-limiting example, an embodiment of an engaging apparatus according to one aspect of the invention and an appropriate method of operation, with reference to the figures.

DETAILED DESCRIPTION OF THE INVENTION

Figure 1:
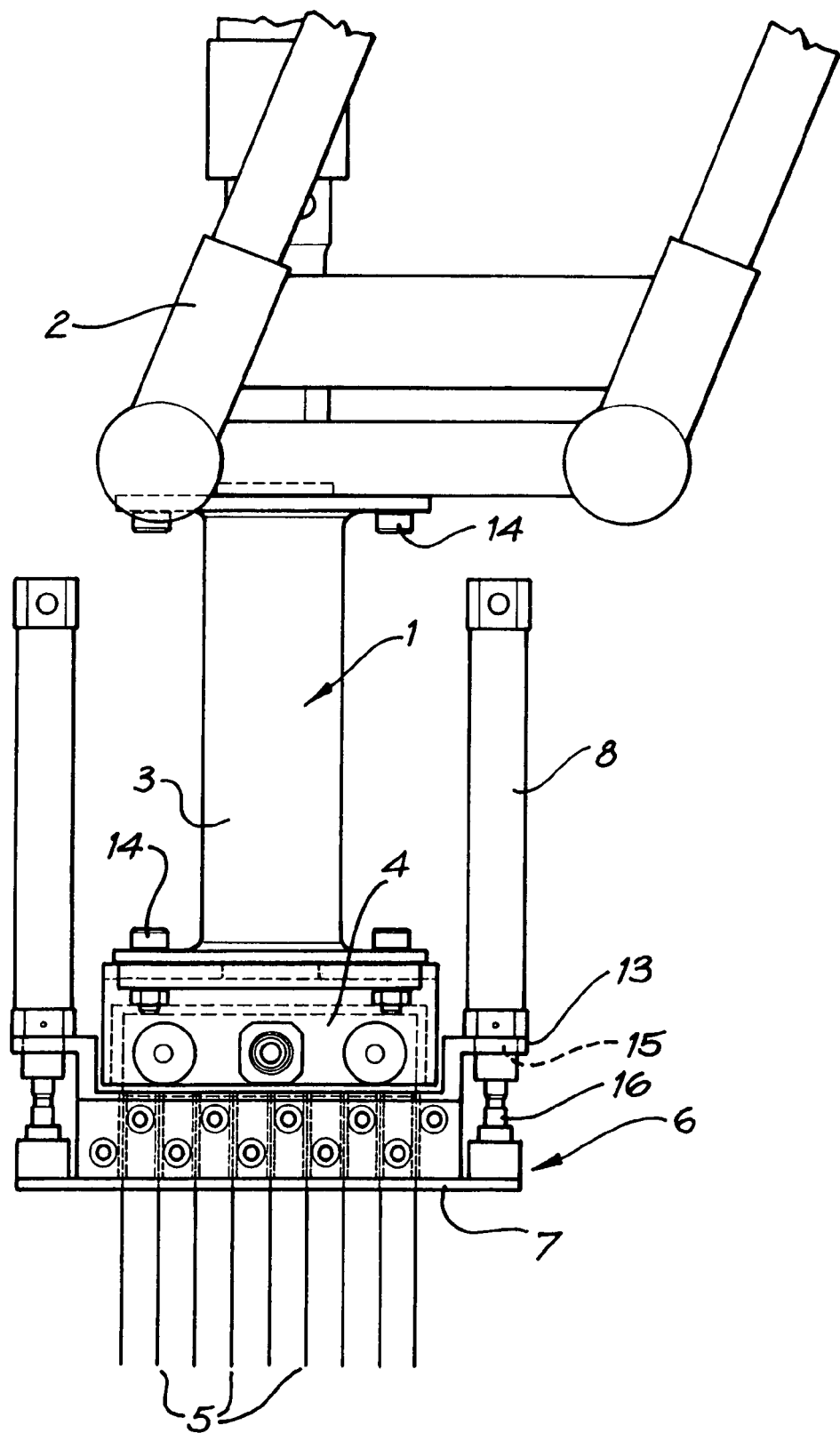
FIG. 1 shows an elevation of an engaging apparatus according to the invention attached to the arm of a programmable robot arm.

Turning first to FIG. 1, there is shown a pick-up and depositing tool 1 according to the invention, which in this embodiment is suitable for forming a group of sliced pieces of reconstituted meat, relocating said group to a food container and depositing the group in a 'shingle' configuration. The tool is attached to a programmable industrial robot arm 2, which effects the movement of the apparatus between its predetermined target destinations, by the bracket 3, which forms part of the tool.

The bracket 3 in this example is shown as a steel beam with a double-T configuration, and which is anchored to both the robot arm 2 and the rest of the tool 4 by Allen-bolts 14. It will be appreciated by those skilled in the art that other bracket configurations may be applied.

The tool further includes a pin anchoring part 4; eighteen individual pins 5 that are used to directly penetrate and impale the meat pieces; and payload ejection apparatus 6 which essentially 'wipes' the impaled pieces downward and off the end of the pins 5. The pins 5 are arranged in two rows of nine parallel shafts, noting that in each of the figures the rear row of nine pins is obscured by the front row. The parallel arrangement helps to prevent damage to the food items as they slide on and off the pins.

The pin anchoring part 4 may be constructed of steel or a suitably strong plastic material, including nylon. The pins 5 are constructed from a food-grade stainless steel, and may have either rounded or sharpened tips. They have an anchoring end (not shown) by which they may be securely anchored to the anchoring part 4.

The ejection apparatus 6 includes an ejection plate 7, which is located directly below the pin anchoring part 4 and which has apertures through which the pins 5 extend, and ejection actuating pneumatic cylinders 8 which actuate the downward and upward motion of the ejection plate 7.

The pneumatic cylinders 8 are anchored to the pin anchoring part 4 via flanges 13, said flanges featuring holes 15 through which the lower portion of said cylinders 8 pass. When activated, the pistons 16 extend downward, thereby actuating downward motion of the plate 7 away from the part 4. While pneumatic cylinders are used in this example, it will be appreciated by the person skilled in the art that any suitably controllable actuation apparatus, such as hydraulic cylinders, electric servo-motors or other mechanical devices may be employed for this function.

In this example, the overall apparatus is required to group and place sliced reconstituted meat pieces in a 'shingle' arrangement. The meat pieces were sliced to approximate dimensions of 22 mm wide×45 mm long×5 mm thick. For such pieces, pins 5 of circular cross-section and approximate diameter of about 1 mm are used. Within each row, the pins are spaced apart by approximately 10 mm and the rows themselves are spaced by approximately 25 mm. For different size pieces and/or for different materials, it will be appreciated by the person skilled in the art that different diameters and spacings may be optimal and that these will be determinable by simple trial.

Figure 2:
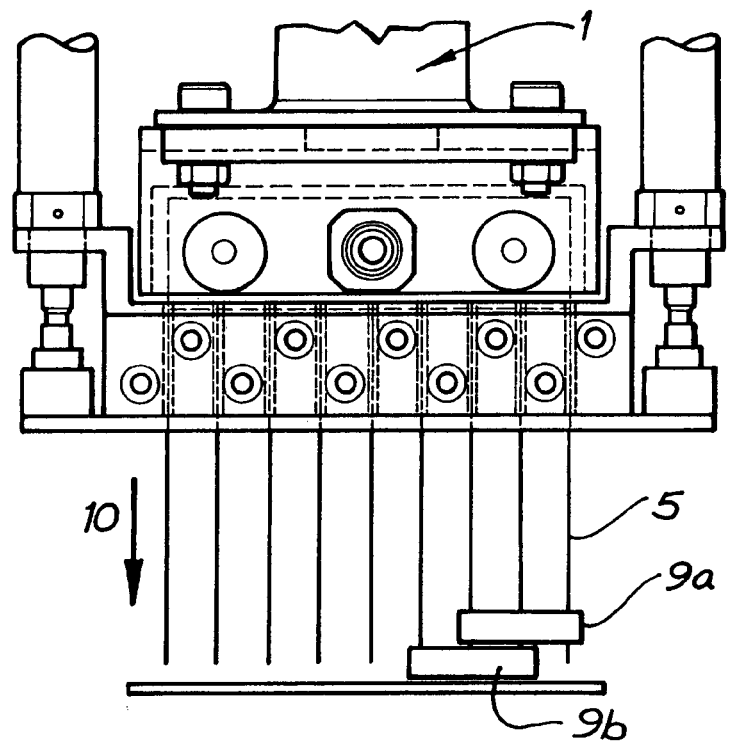
FIG. 2 shows an elevation of the apparatus of FIG. 1 in the process of picking up food items.

Now will be described, by way of example, the operation of the inventive apparatus as it carries out the method of grouping and depositing in accordance with the invention. FIG. 2 shows the pins 5 of the engaging apparatus 1 having penetrated and captured a first meat piece 9a, and in the process of penetrating a second meat piece 9b as it moves downward in the direction of the arrow 10.

The movement of the robot arm 2 may be programmed to approach the individual meat pieces such that each successive piece is penetrated in a position that causes it to be captured at a slightly offset position from the preceding piece. In practice, the first piece 9a is captured, followed by lifting upward of the apparatus 1 and repositioning above the second piece 9b at an offset position, followed by downward movement of the apparatus such that the pins 5 penetrate the food piece 9b, whilst this food piece contacts the food piece 9a and pushes it upwards along the pins 5. This procedure is repeated until the desired number of food pieces is captured.

In this particular example, the offset is selected to be approximately one third of width of the food pieces, but any desired offset (or none at all) may be selected for aesthetic purposes relating to the final positioning of the group of food pieces.

Figure 3:
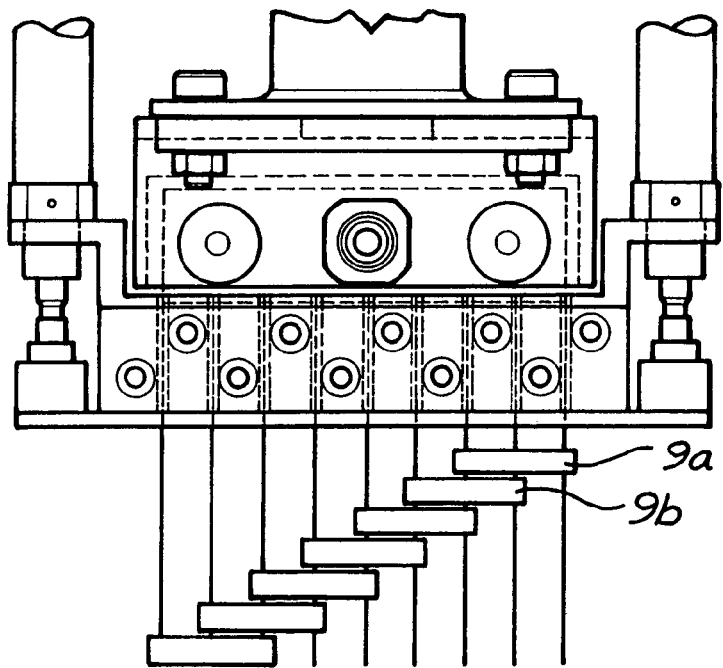
FIG. 3 shows an elevation of the apparatus of FIG. 1 having completed the process of picking up food items.

FIG. 3 shows the apparatus 1 having completed seven iterations of the penetration and capture procedure and thereby capturing seven food pieces. The robot arm then moves this group of food pieces to the discharge position, typically above the intended food container.

Figure 4:
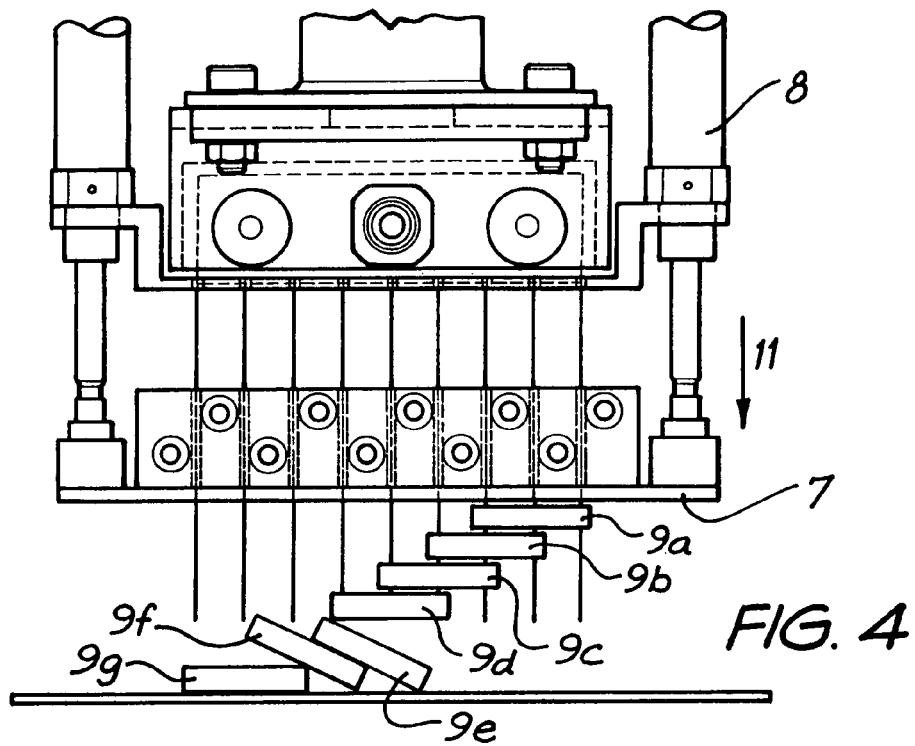
FIG. 4 shows an elevation of the apparatus of FIG. 1 in the process of depositing a group of food items.

Once located over the discharge position, the discharge cylinders 8 are actuated, which forces the discharge plate 7 downward. The plate 7 engages with the uppermost food piece 9a, which in turn engages with the next uppermost food piece 9b and so on such that all food pieces are uniformly pushed downward in the direction of the arrow 11 and off the ends of the pins 5. In FIG. 4, the apparatus is shown part-way through this process, wherein the lower food pieces 9g, 9f and 9e have been discharged.

It will be noted that as these pieces are discharged they naturally tend to come to rest in the desired 'shingle' arrangement. This tends to happen due to the fact that the downward force applied to each piece is directed at a point offset from the center of gravity of the piece, by virtue of the offset positioning of the pieces relative to one another. This tends to impart a slight rotation to each piece about with respect to the horizontal plane, resulting in the angled positioning of the pieces relative to one another as they come to rest.

Figure 5:
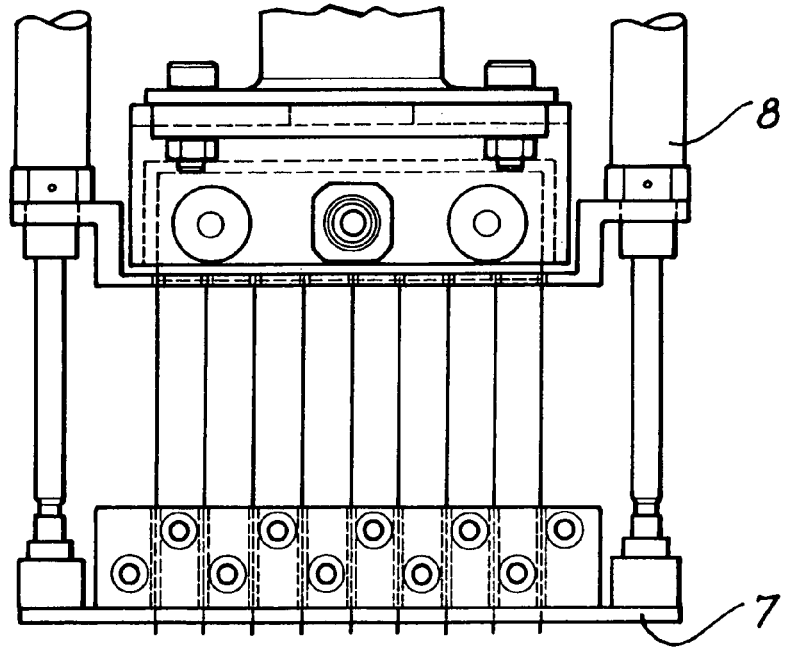
FIG. 5 shows an elevation of the apparatus of FIG. 1 having deposited a group of food items.
Figure 5:
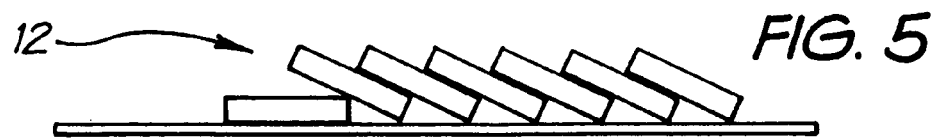

FIG. 5 shows the discharge operation completed, with the discharge plate 7 fully extended and the complete 'shingle' of food products 12 lying in position at their destination.

While this example relates to reconstituted meat pieces of a particular size and shape, the person skilled in the art will appreciate that the general concept described herein is equally applicable to other penetrable items, and that suitable spacing and dimensions for the pins 5 may readily be selected for other specific desired applications as desired.

What is claimed is:

1. A method of compiling and depositing a shingled array of a predetermined number of penetrable food items, using an engaging tool having a bracket arranged to couple the tool to a device for imparting controlled movement to the tool, preferably a programmable robot arm; a plurality of fixed penetration pins arranged to facilitate the capture of food items by impalement; a penetration pin support member attached to said bracket and to which are anchored said pins, said pins being arranged such as to extend away from said support member; an ejection member for interacting with said support member, having apertures through which said pins project, and means for imparting relative movement between the support member and the ejection member, said method including the steps of:
    a) presenting a plurality of food items on a substantially flat surface;
    b) positioning said tool above a first item such that two or more pins which are offset from the center of said array of pins are directly above said item;
    c) lowering said tool such that said offset pins are caused to penetrate substantially through said item thereby to capture it via impalement;
    d) raising said tool and said captured item and repositioning it above a second item, such that said first item is positioned above said second item in an offset manner, said offset distance being less than the dimension of the first item in the direction of offset;
    e) repeating steps c) and d) above until the predetermined number of items has been captured;
    f) positioning said tool above the destination of the array of items; and
    g) depositing said array by actuating said ejection plate in a downward motion to eject with an ejection member said array of said items from said pins as a group resembling a shingle.

2. The method of claim 1 wherein said food items are impaled such that they are captured and held by frictional forces in a position along said pins between the penetrating tip of said pins and said ejection member.

3. The method of claim 2, wherein deposition of said items is effected by actuation of movement of said ejection plate in a relative direction away from said support member, thereby to push said food items off the end of said pins.

4. The method of claim 3, wherein said pins are between 0.5 mm and 2.5 mm in diameter.

5. The method of claim 4, wherein said pin diameter is about 1 mm.

6. The method of claim 1 wherein said the pins are disposed in at least one row, said row or rows consisting of a plurality of relatively evenly spaced pins extending substantially parallel with one another.

7. The method of claim 6, wherein there are two or more rows of nine individual pins, wherein the pins within said rows are spaced apart by between 5mm and 15 mm, preferably about 10 mm, and wherein the rows are spaced apart by between about 15 mm and 35 mm, preferably about 25 mm.

8. The method of claim 7, wherein the pins within said rows are spaced apart by about 10 mm, and wherein the rows are spaced apart by about 25 mm.

9. The method of claim 1 wherein said ejection member is a plate that is arranged substantially parallel with the adjacent surface of the support member, and wherein said ejection plate moves relatively away from said support member while maintaining a substantially parallel alignment with said member to effect deposition.

10. The method of claim 9, wherein the penetration pins extend through individual holes in said ejection plate.

11. The method of claim 9, wherein the ejection plate features slots extending from one side of said plate, and wherein said pins extend through said slots.

12. The method of claim 1, wherein one or more actuation devices, such as pneumatic cylinders, hydraulic cylinders or electrical servo-motors, are mounted on said support member and feature extension arms that are connected to said ejection member, wherein extension of said arms actuates said relative motion of said ejection member with respect to said support member.

* * * * *